United States Patent

Haese

[11] 4,099,554
[45] Jul. 11, 1978

[54] CONTROL SYSTEM TO REGULATE THE WALL TEMPERATURE OF A PRESSURE VESSEL

[75] Inventor: Egon Haese, Bochum, Fed. Rep. of Germany

[73] Assignee: Dr. C. Otto & Comp. G.m.b.H., Bochum, Fed. Rep. of Germany

[21] Appl. No.: 752,295

[22] Filed: Dec. 20, 1976

[30] Foreign Application Priority Data

Dec. 18, 1975 [DE] Fed. Rep. of Germany ....... 2557085

[51] Int. Cl.² ........................................... G05D 23/00
[52] U.S. Cl. ...................................... 165/32; 165/40; 176/60
[58] Field of Search ....................... 165/32, 34, 39, 40; 176/60

[56] References Cited

U.S. PATENT DOCUMENTS 3,251,747  5/1966  Franke et al. ........................... 176/60

FOREIGN PATENT DOCUMENTS 259,372  5/1963  Australia ................................. 176/60

Primary Examiner—Edgar W. Geoghegan
Attorney, Agent, or Firm—Thomas H. Murray

[57] ABSTRACT

A control system for a pressure vessel receiving a flow of hot rare gas, such as helium, from a nuclear reactor. The control system includes a thermocouple supported on the vessel wall within an airgap formed by an outwardly-spaced layer of insulation. An aperture in the bottom of the layer of insulation feeds air into the airgap. Air is withdrawn through an aperture in the top of the layer of insulation and passed along a conduit containing a control valve, and thence, through a motor controlled blower to a chimney. A controller receives the signal from the thermocouple for adjusting the control valve to both maintain a small continuous airflow and adjustably control the flow of air delivered by the conduit line to the chimney. The controller also controls the motor-driven blower. The flow of helium through the pressure vessel is detected to provide an output signal for controllably varying the operation of the blower. The same blower may be controlled by detector means which respond to the operation of a second blower used within the pressure vessel to maintain a flow of helium therethrough. In the absence of helium flow, the detector is energized to operate the blower associated with the chimney to prevent the development of an excessive wall temperature of the pressure vessel.

5 Claims, 1 Drawing Figure

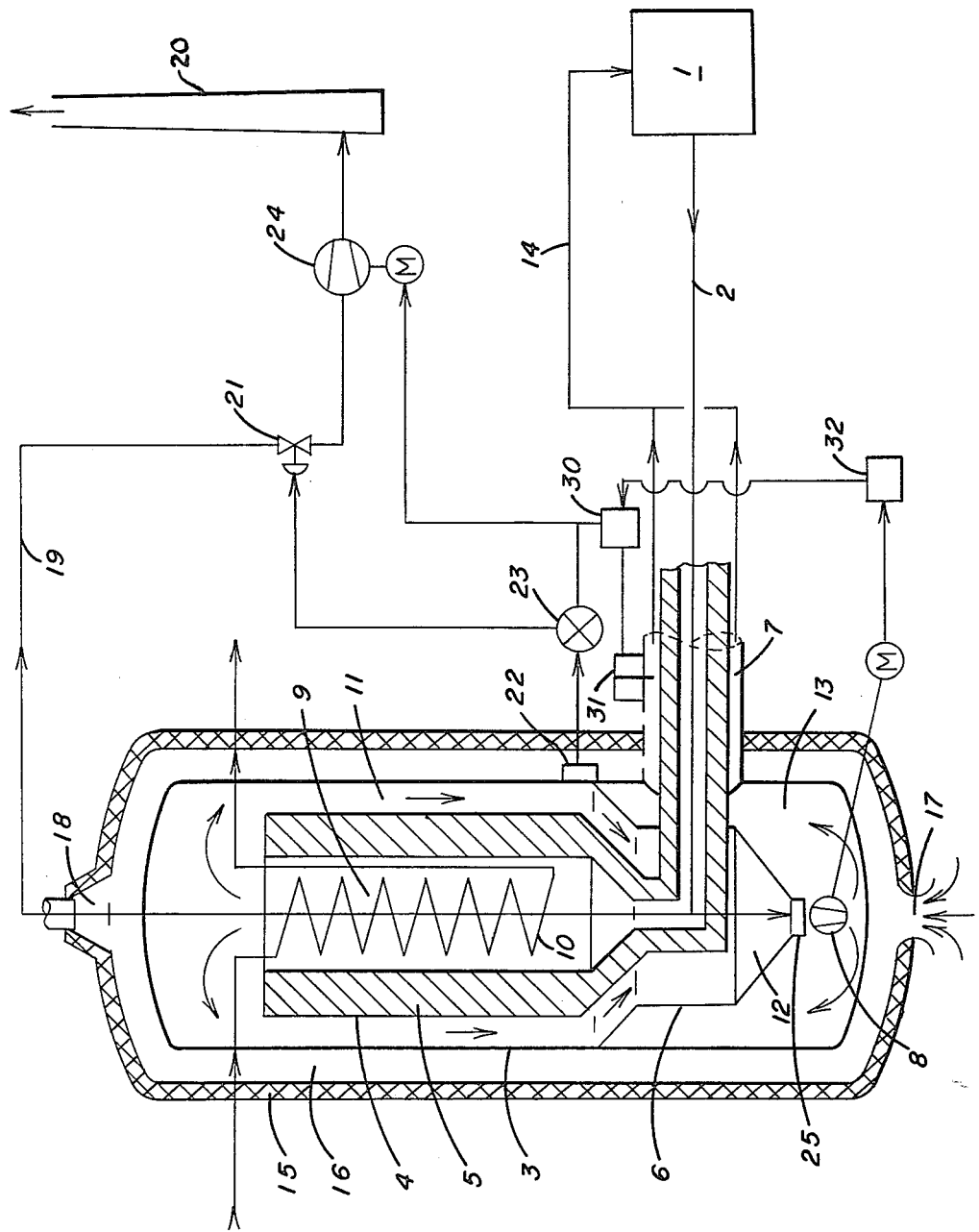

CONTROL SYSTEM TO REGULATE THE WALL TEMPERATURE OF A PRESSURE VESSEL

BACKGROUND OF THE INVENTION

This invention relates to a control system for regulating the wall temperature of a pressure vessel adapted to conduct hot rare gas, particularly helium, from a nuclear reactor.

A pressure vessel of this type which is sometimes referred to in the art as a boiler, receives gases under pressure at a specific and required temperature range. If heat is given up to the gas by indirect heating or by an exothermic chemical reaction taking place in the gas itself, then the temperature of the gas rises. The gas passing through the vessel or boiler is frequently used as a heating medium in which case heat is transferred from the gas to another medium, usually by indrirect heat transfer. The heat withdrawn from the gas is used to generate steam or to carry out endothermic chemical reactions. In such instances, the temperature of the gas flowing in the vessel or boiler drops.

Vessles constructed in the manner known in the art to conduct a gas at a high temperature gradient, take the form of a double-jacket vessel. The gas is guided through such a vessel so that the gas, at a relatively cooler temperature, flows through an annular chamber between an outer jacket and an inner jacket which is usually not subjected to pressure. If the low temperature of the gas is above 100° C, it is a conventional practice to apply insulation directly onto the outer skin of the outer pressure jacket.

The temperature of the gas flowing through the inner vessel is frequently so high that the inner vessel is provided with a layer of insulation, such as masonry. The inner vessel may be filled with a catalyst or other ceramic or metallic material so that the total mass thereof provides a considerable heat storage capacity.

If the flow of gas through an externally-insulated pressure vessel is interrupted due to a malfunction, such as a breakdown of a blower or the like, the stored heat by the mass of the inner vessel is transferred or otherwise passed to the surrounding parts. As a result, a temperature equalization occurs. The wall of the outer pressure vessel undergoes a temperature rise beyond the permissible temperature whereby the outer wall of the vessel may tear or fracture. In practice, the risk of vessel failure is frequently encountered due to the expansion of the pressure vessel.

The expansion of hot, particularly combustible gases, is not without risk and requires expensive safety devices. There is also a specific danger if the gas in the pressure vessel is a contaminated rare gas, such as helium, which is heated in a nuclear reactor and remains in communication with the reactor during the malfunction. Expansion of the gas in the atmosphere is impossible because of the risk of contamination and the high cost of the gas. The investment for equipment to rapidly cool a flow of helium from a reactor, purifying the helium and collect it is very high.

In such instances, therefore, it is conventional practice to dispense with external thermal insulation and cool the outer skin of the pressure vessel. To this end, the wall of the pressure vessel is provided with, for example, cooling ducts or cooling coils which are welded onto the wall for the passage of cooling water or a cooling gas. The loss of energy during normal operation of the vessel due to the flow of heat in the cooling medium is considerable but is acceptable for safety reasons.

SUMMARY OF THE INVENTION

It is an object of the present invention to alleviate energy losses due to continuous cooling of a jacket of a pressure vessel and insure that, in the event of failure of the flow of gases into the vessel, the wall temperature of the vessel is maintained at the originally-intended temperature during the entire cooling operation to thereby essentially minimize the risk of thermal shocks and, hence, cracking of the vessel in the event of spontaneous cooling thereof.

It is a further object of the present invention to provide a control system to regulate the wall temperature of a pressure vessel wherein there flows hot rare gas, such as helium, supplied from a nuclear reactor.

The present invention is addressed to a pressure vessel adapted to receive a flow of hot rare gas, such as helium, from a nuclear reactor, the pressure vessel includes an outer layer of insulation, an outer pressure jacket spaced inwardly from the layer of insulation to form an airgap therebetween, a chimney coupled by a conduit line to an aperture in the top of the outer layer of insulation which further includes a bottom aperture, an inner jacket having an open top and a conical bottom disposed within the outer pressure jacket to form an annular chamber therebetween, a layer of insulation supported by the inner jacket, a coincal apron including a bottom opening surrounding the conical bottom end of the inner jacket, the conical apron separating the annular chamber between the inner jacket and the outer pressure jacket to define a bottom chamber in the outer pressure jacket, the bottom chamber communicating with an outlet conduit which surrounds an inlet conduit for feeding hot rare gas into the conical bottom end of the inner jacket. The arrangement of parts being such that hot rare gas from a nuclear reactor passes from the inlet conduit to flow upwardly within the inner jacket and then downwardly along the annular chamber to enter into the bottom chamber and pass into the outlet conduit.

In such a pressure vessel, the present invention provides the combination of a control system including a thermocouple supported for response to the wall temperature of the outer pressure vessel within the airgap formed by the outer layer of insulation to produce a temperature signal corresponding thereto, a controller receiving the temperature signal to produce a control signal corresponding to the development of a predetermined excessive wall temperature in the outer wall of the pressure vessel, and control means responsive to the control signal to both maintain continuous airflow and adjustably control the flow of air delivered by the conduit line into the chimney from the airgap through a top aperture in the outer layer of insulation.

Thus, the present invention provides a thermocouple located on the outer wall of the pressure jacket in the airgap between the pressure jacket and the outer layer of insulation. The thermocouple is connected to a controller which, when a predetermined wall temperature is exceeded, controls the control unit coupled in a conduit extending between the top aperture in the outer layer of insulation and the chimney. The control unit controls the amount of air entering the airgap through the bottom aperture in the insulation and discharged via the conduit. The controller being continually operative and so adjusted that the control unit continually passes a small amount of air.

According to a further feature of the present invention, the conduit leading to the chimney includes a blower arranged after the control unit, i.e., downstream thereof, which blower is also controlled by the controller. In a further aspect of the present invention, the blower is switched ON by a safety circuit which is controlled in a dependent relation to the amount of gas flowing through the pressure vessel.

According to a further feature of the present invention, the blower is switched ON in a dependent relation to the speed of a motor-driven blower disposed in the bottom portion of the pressure jacket arranged in front of the outlet aperture of the conical apron.

These features and advantages of the present invention as well as others will be more fully understood when the following description is read in light of the accompanying drawing, wherein there is schematically illustrated, a control system embodying the features of the present invention together with an elevational view, in section, of a pressure vessel.

Hot rare gas, for example, helium, at a temperature of 800° to 1000° C and at a pressure of about 20 to 80 bar is fed from a nuclear reactor 1 by a conduit 2 into a pressure vessel. The pressure vessel includes an outer pressure jacket 3 and an inner jacket 4. The inner jacket 4 includes an internal layer of insulation in the form of an insulating masonry lining 5 that tapers conically at the lower portion of the jacket. The conduit 2 used to conduct the hot rare gas from the nuclear reactor is also provided with a masonry lining which extends to the lower conical portion of the masonry lining 5. The conduit 2 extends laterally from the pressure vessel. A conically-tapering apron 6 is located at the bottom portion of the space formed by the outer pressure jacket 3. The apron 6 surrounds the conically-tapering part of the inner jacket 4 as well as part of the inlet conduit 2. The top end of apron 6 is connected in a tightly-sealed relation to the outer pressure jacket 3. The apron includes a bottom aperture 25. The conical apron separates or divides an annular chamber 11 located between the inner jacket 4 and the pressure jacket 3 from chamber 13 surrounding the bottom of the apron 6. Surrounding the inlet conduit 2 is an outlet conduit 7 for the helium which communicates with the chamber 13 and returns the helium via conduit 14 to the reactor 1.

A blower 8 is driven by a motor and located in chamber 13 in front of aperture 25 and apron 6. Blower 8 circulates the hot rare gas. Chamber 12, surrounded by the conical apron 6, communicates with annular chamber 11 so that gas introduced through the inlet conduit 2 first flows upwardly through the chamber 9 from where the gas flows downwardly through the annular chamber 11 into chamber 12 and thence into chamber 13 for discharge from the pressure vessel through conduit 7.

The inner chamber 9, which is formed by the insulating masonry lining 5, contains a pipe coil 10 symbolically intended to indicate that the heat dissipation from this chamber occurs through the provision of pipe coil 10. The dissipation of heat can be effected by heating of a gas, generating steam or by the process of an endothermic chemical reaction. The inner chamber 9 may also be made from ceramic, metal or other heat dissipating elements to improve the transfer of heat to the pipe coil 10 so that the thermal capacity of the inner masses is increased.

The pressure vessel is surrounded by an outer layer of insulation 15 which is so disposed in a manner to form an airgap 16 between the outer layer of insulation 15 and the outer wall surface of pressure jacket 3. An aperture 17 is formed at the bottom end of the outer layer of insulation 15 whereby cooling air flows through aperture 17 into the airgap from where the cooling air is discharged through a top aperture 18 in the outer layer of insulation 15. The top aperture 18 is connected by a conduit 19 to a chimney 20. Conduit 19 includes a control unit 21, such as a valve. A thermocouple 22 is provided on the wall 3 of the pressure vessel and delivers an output signal corresponding to the vessel wall temperature to a controller 23. The controller 23 produces a control signal which triggers the control unit 21 when a predetermined boiler or vessel wall temperature is exceeded. During normal operation, the control unit 21 is opened to only a very small extent. The controller 23 is always kept in operation and a small quantity of air flows continually through the airgap to the chimney 20.

In the event there is an interruption to the flow of helium or other rare gas in the complete system, such as, for example, due to an operational failure of blower 8, a temperature equalization will take place in the pressure vessel whereby there is an increase in the wall temperature. The increased wall temperature is sensed by thermocouple 22 which delivers a signal to controller 23 which, in turn, delivers a control signal to control unit 21 for operation thereof to increase the flow of coolant air to a sufficient extent within the airgap 16.

The draught provided by the chimney is normally sufficient to withdraw a sufficient amount of coolant air from airgap 16. In special instances where the chimney draught is not sufficient, the present invention provides that the blower 24 in conduit 19 is energized. The motor for the blower is controlled by controller 23. That is, the motor is energized when a predetermined wall temperature is exceeded as detected by the thermocouple 22. The motor for blower 24 may, alternatively, by turn ON via a safety circuit 30 which includes a controller that is responsive to a signal from a flowmeter 31 which meters the flow of helium in conduit 7 or, alternatively, is desired, in conduit 2. The controller 30 is also responsive to the output signal from detector 32 which is energized in response to operation of a motor for operating blower 8. In the preferred aspect of the present invention, the flowmeter 31 provides a signal which corresponds to the amount of hot rare gas flowing through the conduit into or out of the pressure vessel. The signal provided by the motor associated with blower 8 is also preferaly generated so as to correspond to the speed at which the blower operates to withdraw the hot rare gas from chamber 12 into chamber 13.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a pressure vessel adapted to receive a flow of hot rare gas such a helium from a nuclear reactor, said pressure vessel including an outer layer of insulation, an outer pressure jacket spaced inwardly from said layer of insulation to form an airgap therebetween, a chimney coupled by a conduit line to an aperture in the top of said outer layer of insulation which further includes a bottom aperture, an inner jacket having an open top and a conical bottom end disposed within said outer pressure jacket to form an annular chamber therebetween, a layer of insulation supported by said inner jacket, a conical apron including a bottom opening surrounding the conical bottom end of said inner jacket, said conical apron separating said annular chamber between said inner jacket and said outer pressure jacket to define a bottom chamber in said outer pressure jacket, said bottom chamber communicating with an outlet conduit which surrounds an inlet conduit for feeding hot rare gas into the conical bottom end of said inner jacket, the arrangement of parts being such that hot rare gas from a nuclear reactor passes from said inlet conduit to flow upwardly within said inner jacket and then downwardly along said annular chamber to enter said bottom chamber and pass into said outlet conduit, the combination therewith of a control system including the combination of:

- a thermocouple supported for response to the temperature of the outer wall of said outer pressure vessel within said airgap to produce a temperature signal corresponding thereto,
- a controller receiving said temperature signal to produce a control signal corresponding to the development of a predetermined excessive outer wall temperature of said outer pressure vessel, and
- control means responsive to said control signal to both maintain continuous airflow and adjustably control the flow of air delivered by the conduit line into said chimney from said airgap through the top aperture in said outer layer of insulation.

2. The control system according to claim 1 further including a blower coupled to said conduit line between said chimney and said control means.

3. The control system according to claim 2 wherein said blower is controlled by the control signal from said controller.

4. The control system according to claim 2 futher including detector means responsive to the amount of hot rare gas flowing through said outer pressure vessel, and circuit means responsive to the output signal from said detector means to controllably vary operation of said blower.

5. The control system according to claim 2 futher comprising hot rare gas blower means within said annular chamber, detector means responsive to the operational speed of said hot rare gas blower means, and means to energize said blower in response to the output signal of said detector means.

* * * * *